June 4, 1968

P. L. GOUPILLAUD ET AL  3,387,258
METHOD AND APPARATUS FOR COMPILING AN F-K
PLOT OF A SEISMIC RECORD

Filed May 6, 1965

INVENTOR.
PIERRE L. GOUPILLAUD &
JERRY A. WARE
BY

*William J. Miller*

ATTORNEY

Fig. 6

United States Patent Office 3,387,258
Patented June 4, 1968

3,387,258
METHOD AND APPARATUS FOR COMPILING AN F–K PLOT OF A SEISMIC RECORD
Pierre L. Goupillaud and Jerry A. Ware, Ponca City, Okla., assignors to Continental Oil Company, Ponca City, Okla., a corporation of Delaware
Filed May 6, 1965, Ser. No. 453,621
11 Claims. (Cl. 340—15.5)

This invention relates to improvements in the art of geophysical prospecting, and more particularly, but not by way of limitation, relates to an improved method and apparatus for producing a two-dimensional power spectrum of a seismic cross-section.

Recent developments in the art of geophysical prospecting have established the velocity-type filter as a highly effective and preferable mode of treatment for deriving some forms of interpretative data from seismic records. While the prior methods of frequency domain and time domain filtering still have their application in certain treatments, velocity filtering has proven to be of invaluable assistance for interpretation of records which have certain interference characteristics. Velocity filtering is particularly effective in the interpretation of seismic records containing excess amount of coherent noise and other unconformable dip and movement patterns of an interfering nature. Such forms of interference as conform to certain uniform velocity characteristics can be counteracted through velocity filtering which may be said to operate within the frequency versus wave number domain.

In order to design a proper velocity filter for a given application, it becomes essential to have some manner of producing a two-dimensional power spectrum of a seismic cross-section of the area of interest. With such a power spectrum indication, a source of information is supplied which provides a direct indication of the distribution of the seismic energy as a function of its velocity. A plot of frequency and wave number of the signal content of a seismic record will supply the needed information so that the velocity distribution of the desired information can be ascertained and employed for discriminating against unwanted signals present in the record.

The present invention contemplates a method for plotting the many returns indicated on a seismic record in terms of their frequency $f$ and wave number $k$. The invention further contemplates forms of apparatus which may be used to derive such a plot. The apparatus performs the assessing of information from all traces of a seismic record and in such a manner that the algebraic addition of simultaneously sensed energy is employed to yield a frequency versus wave number plot of all energy appearing on the record so that seismic energy velocity information can be directly drawn from the plot.

The apparatus of the invention provides equipment for making repeated scans of a multi-trace seismic record with an algebraically summing transducer head which senses all traces simultaneously. The transducing head is rotated to a number of different angles, one for each scanning of the seismic record so that, effectively, each individual scanning at a given angle will be the equivalent of sensing that segment of the power being received by the geophone array which is arriving at a given apparent velocity. This velocity can be equated to the angle of the transducer head across the seismic record and similarly a recorder plotting arm is oriented with, and driven in response to, the angle of the transducer head. The summed output from the transducer head is also divided into a number of consecutive frequency bands so that the energy arriving at a given velocity can also be classified as to its frequency; hence, the velocity being known or computed and the frequencies thus being derived, the energy for each of the frequencies is then plotted in terms of wave number.

It is an object of the present invention to provide a method for deriving a two-dimensional power spectrum of a seismic cross-section.

It is also an object of this invention to provide a method and apparatus for the derivation of frequency and wave number of the individual energy components which are present as recorded in multi-trace seismic records.

It is further an object of this invention to provide apparatus for sensing all energy components at a given velocity and providing an electrical output which is representative of that energy in each of a multiple of frequency bands.

It is still another object of the present invention to provide recording apparatus which provides the desired velocity information in the form of a plot of frequency versus the wave number of the received energy.

It is also an object of this invention to provide a method and apparatus for forming a frequency versus wave number plot which is variable as to the inclusive frequency and the range of velocities for which the plot is compiled.

It is still another object of this invention to provide a method and apparatus for deriving a power spectrum plot of energy received in a given seismic shot or impulse sequence such that all necessary velocity information can be derived for the purpose of best designing and applying a velocity filter for the given survey area.

Finally, it is an object of the present invention to provide a method and apparatus for forming a frequency versus wave number plot which can be readily run in the field from an initial seismic return record such that necessary velocity information can be derived and thereafter used in setting up the correct velocity filter network for subsequent recordings.

Other objects and advantages of the invention will be evident from the following detailed description when read in conjunction with the accompanying drawings which illustrate the invention.

General

The seismic records obtained for a given area are very often masked with a great variety and degree of interference signals which tend to make the desired events indistinguishable or hard to recognize and interpret. As it has been stated, the velocity-type filters have been found to give a very high degree of improvement to records containing certain interference problems. These velocity filters are found to give a very good improvement in signal-to-noise ratio once the proper velocity filters are assembled for the given area. However, a very serious problem arises with the initial determination of velocities necessary for setting up the proper filter, and the determination of these velocities rapidly, so that filters can be varied for best results through an operating procedure in the field.

Velocity as referred to herein is the apparent velocity as opposed to the actual velocity of the seismic impulses in the earth. The apparent velocity is a value which can arise in a seismic shot procedure wherein a geophone array is employed. This value of apparent velocity is derived from considerations of the fact that seismic impulse reflections from various depths of strata, as well as surface and near-surface wave components, all approach the geophone array from different angles. Hence, for a given impulse, the time difference between the detection of the same impulse at two different geophones can be used to derive an apparent velocity. The apparent velocity then affords a direct indication of the direction of travel, and hence the depth of the reflecting or guiding strata, of the seismic energy identifiable in a group of seismic traces. That is, side-by-side simultaneous impulse recording as generally carried out to record detected information from an array of geophones.

In general, the seismic impulses arriving at the higher apparent velocities are the bulk of the desired data since this information will have been detected at the array after deep-strata reflection. The higher the apparent velocity, the deeper the reflecting strata will lay. On the contrary various forms of interference such as coherent noise, surface waves, etc. normally show up at lower apparent velocities to complicate the record. Here then is where velocity filtering techniques would find utilization in separating out the desired information with minimal loss through the filter process itself.

In order to best apply the velocity filter it would be desirable to refer to a complete power spectrum of all energy in the particular multi-trace seismic record. The frequency $f$ versus wave number $k$ plot, as formed in the manner to be set forth below, provides a power spectrum of the desired characteristics. The total seismic energy, as received through the geophone array and recorded, is pictorially classified as to its frequency and relative amounts of the total energy which arrive at the certain apparent velocities. The number and spacing of velocities examined out of the total energy spectrum is arbitrary and selectable by the operators choice as to the energies of interest. Upon compiling the desired energy disposition, the data is employed to vary the design of the geophone array and select the characteristics of a proper velocity filter.

The wave number $k$ as used here is derived from the basic consideration of $$k = \frac{f}{Va}$$

where wave number $k$ is equal to the division of frequency $f$ by the apparent velocity $Va$. This wave number $k$ is equal to the reciprocal of the apparent wavelength, i.e. it represents the number of wavelength per unit distance. Hence, frequency $f$ being in cycles per second and apparent velocity $Va$ being in units of feet per second, the division yields wave number $k$ in cycles per foot. Since the method deals in terms of apparent velocity for aligning the directivity of particular energy groups, the wave number $k$ is a function of the frequency $f$ of that seismic energy response in each velocity group or segment. The wave number $k$ increases or decreases with the frequency response at a rate which is dependent upon the apparent velocity $Va$. It will be apparent too that in the case of the detection of back-scattered energy, it will be possible to have a negative wave number as shown on the $f$–$k$ plot.

*Detailed description*

Figure 1:
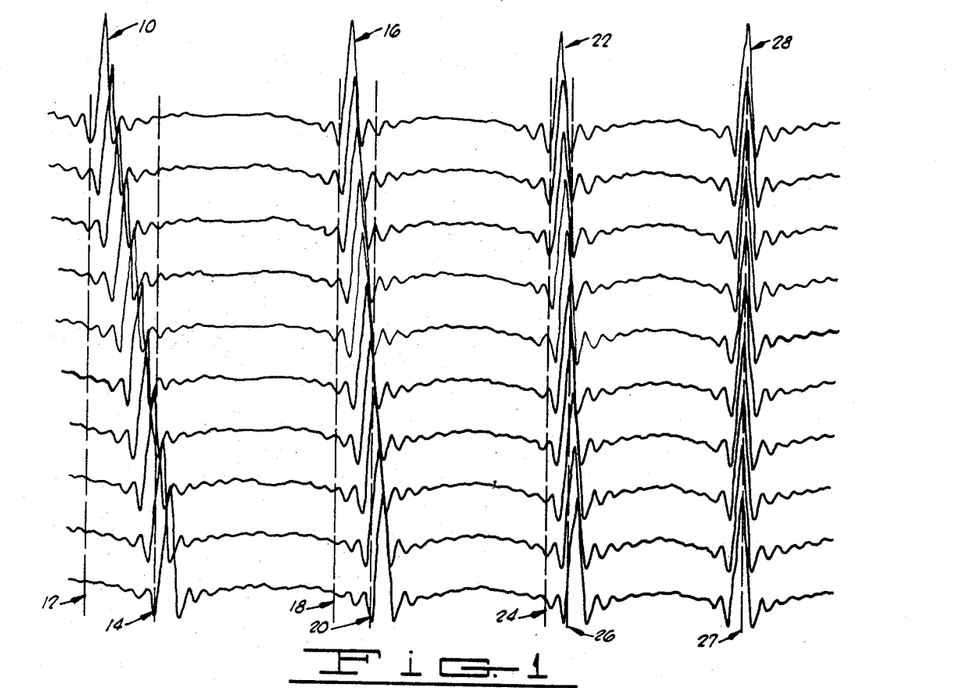
FIG. 1 is an idealized showing of a portion of a multi-trace seismic record.

FIG. 1 shows a seismic record section taken with a ten geophone array, the energy received by each geophone showing up on a separate trace. This showing is highly idealized since in practice there would be much interference and the desired events would be more difficult to distinguish. The seismic record was taken with the aid of a linear array of ten geophones, one per trace, each placed 100 feet apart. The first event 10 which appears on the left-hand side of the record can be shown to have the lowest apparent velocity. The total delay time between the first and last geophone responses, that is, between lines 12 and 14, amounts to about 83 milliseconds of trace time. Hence, with the geophones spaced 100 feet apart and 9.1 milliseconds between the arrival of the impulse at each trace, the apparent velocity is computed to be about 12,000 feet per second. Likewise, the total delay of the event 16 is 50 milliseconds from the first to the last trace as indicated by the dashed lines 18 and 20. This event then has a 5.5 millisecond delay between each trace, and it can be shown that this apparent velocity as it affects the geophone array is close to 20,000 feet per second. Event 22 has a still smaller total time delay as shown between lines 24 and 26. This delay amounts to about 2.7 milliseconds per trace, which can be computed to show an apparent velocity of 40,000 feet per second. The last event 28 has approached the geophone array from straight down, or that direction normal to the line of array. The pulses of event 28 have no time delay between the trace time arrivals and, therefore, its apparent velocity is extremely high, approaching infinity.

If the seismic record appeared as clearly as in FIG. 1, there would be no need in establishing the $f$–$k$ parameters for introduction through velocity filtering. However, a certain degree of interference of various types is always present on seismic records and in some cases it is so severe that the desired or proper events are not recognizable. At these times then, velocity filtering may be effective and, in that event, the method and apparatus of this invention is employed to derive those apparent velocities from the jumbled seismic record in terms of frequency and wave number so that they can be applied to properly adjust the velocity filtering equipment. It would be desirable to know how much of the total energy would lie in each of the particular apparent velocity ranges which show up at the geophones because certain true or desired events will be reflected at particular angles having a determinable apparent velocity. Once these desired apparent velocities are found, the undesirable apparent velocities can be deleted from the total of all received energies such that the desired velocities will appear at a much higher signal-to-noise ratio and make their identification easier and more exact.

Figure 2:
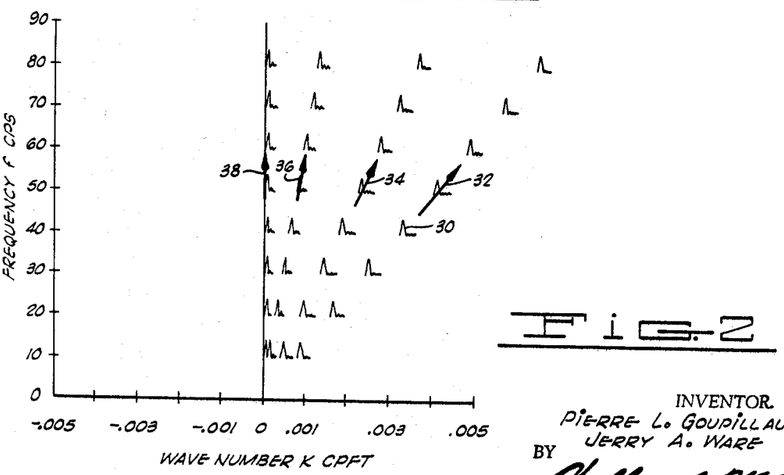
FIG. 2 is an $f–k$ plot of the seismic record of FIG. 1 as it may be formed by the invention.

Referring now to FIG. 2, we see a frequency (c.p.s.) versus wave number (cycles per foot) plot of the seismic record in FIG. 1 which has been compiled in accordance with the invention. The frequency ranges and the individual frequency bands would be determined by calibration of the recording apparatus as will be described. Similarly, the wave number $k$ will follow the calibration. Each of the signal indications, for example, wave form 30, is the result of a summation of seismic events from all traces which happened at the particular frequency and wave number. The true event containing significant energy will give a summation indication for all frequency bands in its range and, as shown by arrow 32, all indications in that line would be the result of a summation across the seimic record at the angle of the line of events 10 which would be equal to a 12,000 feet per second apparent velocity. The arrow 34 denotes the summation of energy falling in the 20,000 feet per second velocity as shown by the events 16 of FIG. 1. Similarly, arrow 36 denotes the 40,000 feet per second energy as shown by 22 and the infinity velocity energy would fall along the perpendicular axis shown by arrow 38. It should be understood, of course, that other spurious signals of various amplitudes would appear on the records, but for purposes of illustration the indications are shown in idealized form. Further, the lines of information 32 through 38 are each shown as having appreciably equal energy at each frequency when, in fact, actual seismic information would often have variable energy content as between the separate frequency band responses. In some cases, the frequency selective indication may be desirable information.

Figures 3, 4:
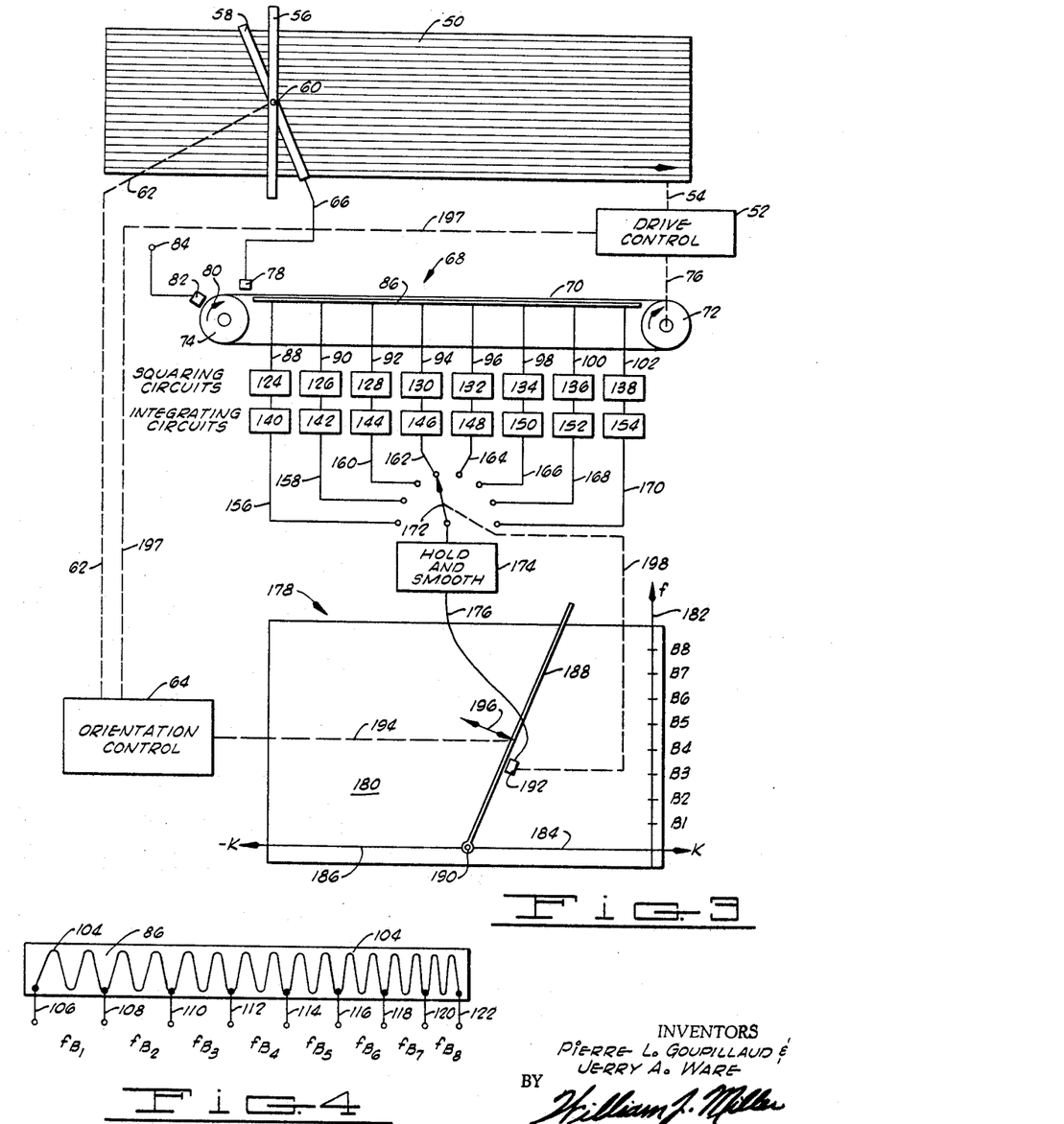
FIG. 3 is a block diagram of one form of apparatus of the invention.
FIG. 4 is an exemplary type of frequency band analyzer employed in the invention.

One form of apparatus for carrying out the method of the invention is shown in FIG. 3. This apparatus serves to consecutively analyze a seismic record 50 a number of times to derive a series of summation signals at each of a group of different velocity relationships. The seismic record 50 comprises ten traces or adjacent signals recorded side-by-side on a memory material, such as on magnetic tape or variable density photographic film, either of which are well known in the art. The seismic record 50 is then placed on a suitable record transport drum or combination of rollers which is driven by a drive control 52 comprising conventional motor and gearing, through a suitable drive linkage 54. At one point along the record track a support member 56 is positioned to carry a wide-head transducer 58 in operative relationship to the seismic record 50. The wide-head transducer 58 is pivotally mounted at axis 60 and connected through a drive linkage 62, shown by dotted lines, to be positioned in response to the orientation control 64. The transducer 58 serves to sense all traces simultaneously at its given position or angle as controlled by the drive linkage 62 such that an algebraically summed signal output is present on a lead 66.

The algebraically summed signal on lead 66 is then applied to a frequency band analyzing device 68 which serves to further break down the summed signal. The frequency analyzer 68 consists of a tape loop 70 running on two pulleys 72 and 74, the pulley 72 being driven by a drive linkage 76 from drive control 52. Thus, there is synchronism of drive between the seismic record 50 and the tape loop 70, and the drive control 52 maintains the proper time relationship. The summation signals on line 66 are conducted to a recorder head 78 which is positioned to record the summation information on the tape 70 moving in the direction of arrow 80. An erase head 82 is situated just prior to the position of recording head 78 and supplied with a suitable erase bias at terminal 84 such that a clear tape will be assured for each operation of the frequency band analyzer 68.

The tape 70 after receiving the recorded information by the head 78 is passed over a printed circuit correlator head 86 which serves to read out the recorded summation energy in a plurality of leads 88 through 102, each conducting an indication of the summation seismic signal energy which was present within a particular frequency band.

FIG. 4 shows a type of printed circuit correlator head which is suitable for this type of frequency analysis. This correlator head 86 is of the type generally employed in vibrational seismic survey operation. The vibrational signal imparted into the earth would be an upsweep or downsweep of frequencies lying within a certain predetermined range. For example, the frequency of vibration may sweep from 20 to 120 cycles at a given rate of change. Thus, in order for correlator head 86 to be effective in the band analysis, the printed circuit configuration should closely approximate the variable frequency sweep signal ranging over the frequency range of seismic interest. Other optical and magnetic types of band analyzers, all well known in the art, may be employed for processing the seismic signals. The optical correlator is particularly suited for use with vibrational seismic return analysis while still other types of correlators could be used for shot or short impulse data.

The printed circuit correlator head 86 is normally formed of suitable insulating substance with a printed circuit or conductive inlay portion 104 formed along its length. The configuration of conductive portion 104 is formed to be identical to an input wave form as supplied at the signal transmission site to drive the seismic source. In the usual case of vibration type seismic sources, the vibrator is controlled to produce a seismic impulse which is controlled as to duration and frequency content, such that a sweep of frequency is produced which is unique and non-repetitive throughout the sweep interval. This type of frequency sweep is shown generally as the arrangement of the conductive portion 104 on the correlating head 86. Thus, the outputs taken between any two of the leads 106 through 122, when properly isolated, will contain voltages at the frequency band included within the particular configuration. Leads 106 through 122 are each connected to the conductive configuration 104 in a manner whereby different frequency band responses can be taken off. Thus, an output between lead 106 and 108 will pertain to correlated output voltage which would fall in the frequency range $FB_1$, represented by that segment of conductor 104. Similarly, each of the leads 108, 110 will be selective to a second frequency band $FB_2$ and leads 110 and 112 would be selective to a third frequency band $FB_3$, etc. The frequencies from 20 to 120 cycles contain most of the usable seismic information. Hence, the frequency bands may be selected to span this range in predetermined bandwidth segments.

Hence, upon occurrence of a correlation between the summation signal recorded at 78 and the printed circuit correlator 86, a separate frequency response of the correlated signal would be conducted on each of the lines 88 through 102. The lines 88 through 102 would be connected, respectively, to conduct the isolated, frequency selective output from each consecutive pair of leads 106 through 102 in FIG. 4. Each of the lines 88 through 102 then connects to separate squaring circuits 124 through 138 and thereafter to separate integrating circuits 140 through 154. The squaring and integrating circuits may be any of the well known types often used in seismic interpretation work. Thus, each of the integrating circuits 140 through 154 will contain an integrated voltage value which will be representative of the correlated output of the initially summed signal, and each integrated signal will be representative of the energy content of the summed signal in a given frequency band. The integrated signals are then conducted on each of leads 156 through 170 to a rotary switch 172.

The rotary switch 172 is arranged to have a contact for each frequency band output; and it should be understood that this may be any number which would be required to give the desired result, depending upon how fine the frequency bands are to be divided. The output from rotary switch 172 taken from the wiper is then applied to a suitable hold and smooth circuit 174, many types of which are well known in the seismic art, and this circuit 174 performs in the well known manner of sampling, holding and smoothing to produce a continuous output signal representing the energy distribution of the various frequency bands. This information is then present in electrical form on a lead 176 for application to a recorder 178 which then constructs or compiles the $f$–$k$ plot.

The recorder 178 comprises a plotting surface 180 which is dimensioned in frequency $f$ along the arrow 182, in positive wave number $k$ along the arrow 184, and in negative wave number $-k$ along the arrow 186. Also, along the frequency dimension as shown by arrow 182, the length is equally divided into a number of segments which will be used to present successive, different frequency bands. These are shown by the indications $B_1$, $B_2$, $B_3$, etc. through $B_8$. A recording arm 188 is pivotally mounted by a suitable axial support 190 at the bottom center of the plotting surface 180. A recording transducer or head 192 of suitable type is arranged to be movable along the recording arm 188. The transducer 192 may be any of the well known types, such as magnetic, optical, oscillating pen, etc., and the plotting surface 180 would therefore be comprised of complementary recording substance or sheet material. It is contemplated that an optical recording system may enable best results since the plotted information can be rapidly presented for utilization in the field. In this case, the transducer 192 would be a suitable, controllable illumination device and the recording surface 180 would comprise a light-responsive substance.

A connecting drive link 194 is attached to drive the angular position of recorder arm 188, as shown by arrow 196, in calibration to the movement of the summation recording head 58 by means of the orientation control 64. The device here shown controls the summation head 58 and the recorder arm 188 to be equi-angular, but of opposite orientation in keeping with the standard plotting configuration. However, this may be reversed if so desired so that the summation pickup head 58 will be oriented in the same direction as the recording arm 188. A second drive synchronism shown by dotted line 198 serves to control the position of recording transducer 192 along the recording arm 188 in accordance with the rotation of rotary selector switch 172. In this manner, the consecutive selected outputs for the various positions of switch 172, being of different frequency bands, will be properly applied along the length of recording arm 188. That is, the lower band frequency will be applied at the latitude of the $B_1$ indication, the next higher at the next latitude of $B_2$, etc.

The mechanical linkages referred to generally may all be provided by selection from a group of devices which are well known in the related arts. For example, the drive linkages 54 and 76 need only be shaft-type drive couplers which are commonly rotated at the desired synchronous rate by the drive control 52. The angular orientation linkages 62 and 194 are well within common knowledge. These may be lever-type controls or other suitable mechanical movement transmission devices which coordinate the movement of the wide-head transducer 58 with recording arm 188 through the orientation control 64. The coordination between rotational selector switch 172 and transducer 192 may be effected with a flexible shaft coupling as the drive linkage 198. A rack and pinion or similar device can be employed to provide longitudinal movement of transducer 192 along the recording arm 188 in response to rotational drive from linkage 198.

Completely automatic operation may be had by synchronizing the orientation control 64 by a linkage 197 to the drive control 52. This merely amounts to energizing the entire system from the drive control 52. It is only necessary to assure that movement of wide-head transducer 58 and recording arm 188 will be slight for each complete scanning of tape loop 70 and seismic section 50.

In operation, a suitable test record section 50 will have been taken so that the $f$–$k$ plot can be run to determine the best manner of setting up the velocity filters for subsequent seismic operation in the area. The test record 50 is shown as having ten traces, but it should be understood that this may be any number of traces depending only upon the design of the pickup head 58 for use therewith. Once the seismic record section 50 has been put on the plotting equipment, the record 50 is sensed an entire time for each of a plurality of different angular positions of the wide-head transducer 58. In other words, for each possible value of moveout time (apparent velocity) which might be present on the record, the record is sensed through one full loop, but this is generally practiced in an orderly manner within certain moveout ranges as can be set by the angular orientation of head 58.

At each single angular orientation of head 58, a complete frequency analysis will be performed and the individual frequency responses, present in the bands $B_1$ through $B_8$, as selected by the correlator head 86 and its outputs, will be indicated along the recording arm 188. Thus, for every angular setting of head 58 the recorder arm 188 will have its own separate angular setting as coordinated and driven by the orientation control 64. Then at each of the recording angles, recording transducer 192 carried by recording arm 188 will make a complete traverse outward in synchronism with the wiper of rotary selector switch 172 such that the successive frequency responses will be indicated along the path of recorder arm 188.

Taking for example the arm settings as they appear in FIG. 3, the wide-head transducer 58 would give a summation signal of all traces and only those events which occur simultaneously at that angle, or that event which has the proper moveout or apparent velocity, would contribute to provide any significant output on lead 66. This output would then be recorded by the recording head 78 on magnetic tape loop 70 which is driven in synchronism with the seismic record 50 by the drive control 52. Then at the correct point in the cycle of tape loop 70, the correlator 86 will become aligned with the recorded information in such a manner that the correlation signal output will be derived along the output segments of correlator head 86. These will appear broken down as to their respective frequency bands on the lines 88 through 102, each of which is connected to suitable squaring and integrating circuits.

Each band output will represent the instantaneous energy along a given velocity line in the seismic section as a function of the reflection time. These outputs are squared and integrated over the length of time corresponding to the time duration of the record section. Assuming now that the orientation of the wide-head transducer 58 is held fixed while the record section 50 is reproduced end to end, it should be clear that each integrator will have accumulated a charge representative of the energy content of events in the seismic section which are in that particular frequency band and which have the moveout corresponding to the orientation of transducer 58. This, of course, can be equated to a certain number of milliseconds of time difference per trace which, in turn, is a direct indication of the apparent velocity.

The scanning around of commutator switch 172 may be effected by either automatic actuation or manual control. In any event, the switch 172 is scanned in synchronism with the traverse of recording transducer 192 on the recording arm 188 in such a manner that the proper frequency band responses will be recorded at the proper latitude on the plotting surface 180. The signal taken off from the switch 172 is smoothed in well known manner in the hold and smooth circuitry 174 to provide that a definitive transition between indications will be assured along the length of recording arm 188.

The above procedure is carried out a series of times, and each time the wide-head transducing element 58 is turned an incremental amount under the control of orientation control 64 and the mechanical linkage 62. Similarly, the recording arm 188 will be realigned as to its angle of plot by orientation control 64. The angular increments adjusted into the wide-head transducer 58 will be a matter of choice for the operator, depending upon the type and amount of velocity information which he is attempting to discern. A short inspection of the original seismic section should generally indicate how best to attack the problem.

Figure 5A:
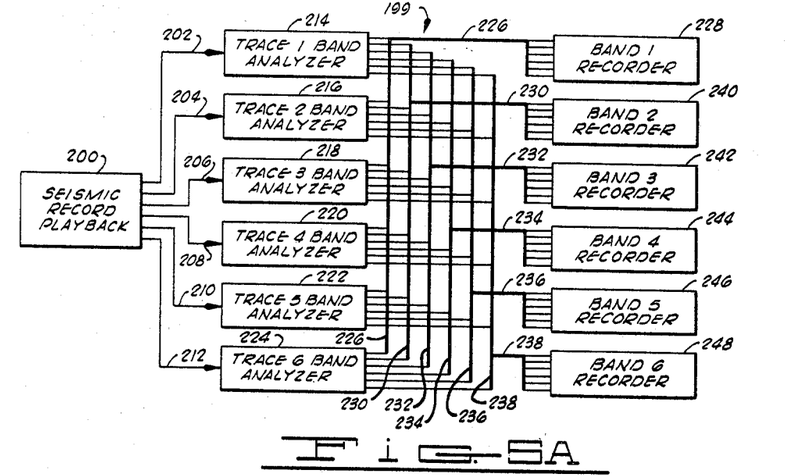
FIG. 5A is an alternative form of frequency band processing apparatus.
Figure 5B:
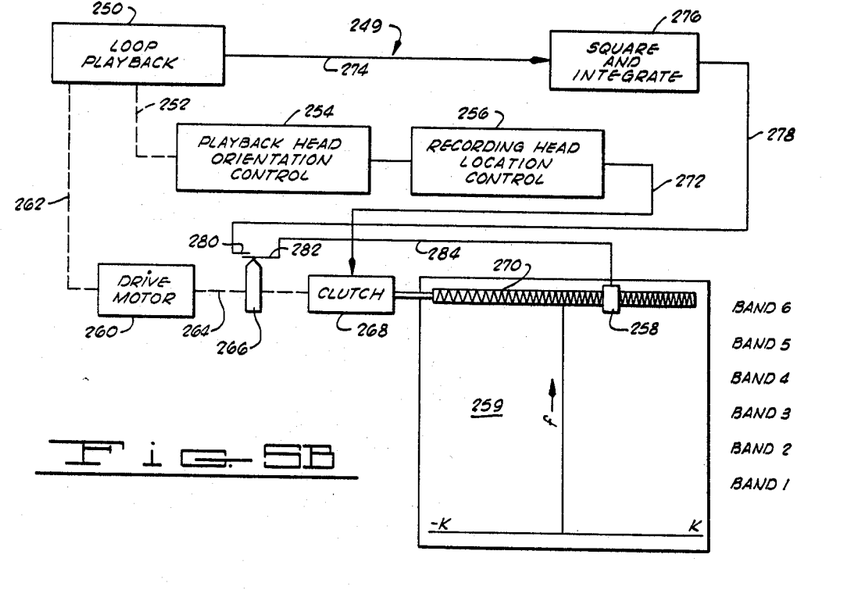
FIG. 5B is an alternative form of velocity sensing playback apparatus which may be used to perform the invention.

*FIGS. 5A and 5B embodiment*

FIG. 5A shows an alternative form of the invention wherein separate operations are employed to first produce individual plural channel recordings of individual frequency band information and thereafter to employ a playback mechanism (FIG. 5B) for summation of the signals at varying different time increments through angular placement of the wide-head transducer. FIG. 5A shows a six trace seismic record 200 being employed with six trace analyzers connected thereafter and then six band recorders. It should be understood, however, that any number of seismic traces may be contained on the seismic record 200 and the number of band analyzers and band recorders may be any number which gives the properly detailed results.

With this apparatus, each trace of the seismic record 200 is reproduced and the resulting signals are conducted on lines 202, 204, 206, 208, 210 and 212 to the individual band analyzers 214, 216, 218, 220, 222 and 224. The band analyzers may be similar to the type shown in FIGS. 3 and 4. Each of the band analyzers 214 through 224 provide six outputs, one for each discrete frequency band, which represent the energy spectrum across all frequency bands for a single trace. All band "one" information is then gathered on leads 226 and applied to the band "one" recorder 228 in multi-trace side-by-side fashion. The same procedure is followed by means of cables 230, 232, 234, 236 and 238 which collect band information from the trace band analyzers 214 through 224, and each of the collection cables then communicates with a separate band recorder 228, 240, 242, 244, 246 and 248 to provide further multi-trace recordings, one for each frequency band. Thus, the band recordings produced by recorders 228 and 240 through 248 will each consist of multi-trace recordings of energy within the specific one of the allotted frequency bands.

This recorded band information is then utilized in the plotting mechanism 249 of FIG. 5B to provide the $f$–$k$ plot. One at a time, the multi-trace band recordings are applied to the loop playback 250 which is similar to the seismic record playback equipment in FIG. 3. The playback 250 employs a wide-head transducer (not specifically shown) which is similar to wide-head transducer 58 in FIG. 3. The wide-head transducer is controlled as to its angle of placement by a linkage 252 from a suitable playback head orientation control mechanism 254. The mechanism 254 may be any suitable mechanical device which can function to index the angular position of the wide-head transducer as performed by the apparatus of FIG. 3. Further mechanical indexing mechanism, a recording head location control 256, serves to control the placement of a recording transducer 258 as will be described. The drive motor 260 is connected through suitable mechanical linkage 262 to drive the loop playback mechanism 250. The second mechanical linkage 264 from the drive motor 260 is utilized to drive a cam switch 266 and, further, to drive through a clutch 268 on to a rotatable screw 270 which is threaded through the recording transducer 258 in conventional manner to afford lateral movement thereof. The clutch 268 is periodically energized by an indication from the recording head location control 256 via line 272. Clutch 268 may be any of the conventional clutch mechanisms, mechanical or electromechanical, which are employed in the related arts. Further, the line 272 energizing the clutch 268 could be either a mechanical connection or an electrical connection both being well known for use in recorder drive systems.

The electrical signal detected by the wide-head transducer in the loop head 250 is passed as an algebraically summed signal on line 274 to a conventional squaring and integrating circuit 276. This voltage as developed in the integrator of circuit 276 is present then on lead 278 which leads to one contact 280 of the cam switch 266. The other contact 282 is connected by lead 284 to the recording transducer 258. Hence, at a certain angle of rotation of the cam 266 the switch will be closed and the integrated voltage will be applied to the recorder transducer 258. This allows sufficient time for a signal integration such that a high signal-to-noise indication will be available for application to the recorder transducer 258 and its associated plotting surface 259. This is generally adjusted so that one complete loop playback in the loop playback mechanism 250 will occur with consequent signal output on lead 274 to the square and integrate circuit 276, and then the cam switch 266 will close contacts 280 and 282 to apply the voltage value to the recording transducer 258.

In the opertion of this alternative embodiment of FIGS. 5A and 5B a multi-trace seismic record of the conventional type is applied to the seismic record playback mechanism 200. The playback mechanism 200 is arranged to simultaneously play each of the seismic traces and provide the outputs on leads 202 through 212 to the respective trace band analyzers 214 through 224. Hence, each of the trace band analyzers provide a number of further outputs, each of which is representative of that portion of the content of the seismic trace which lies within a given, allotted frequency band.

At this poooint then, the trace band analyzer bank (214 to 224) provides outputs which are representative of all frequency band sections for each trace of the seismic section originally employed. The cable array, shown generally as the multi-conductor cables 226 and 230 through 238, then take each separate frequency band of each of the outputs from the trace band analyzers 214 through 224 and record them in side-by-side fashion on a separate tape loop. For example, the band "one" recorder 228 receives in side-by-side fashion all of the frequency band "one" outputs from each of the traces as analyzed in the band analyzers 214 through 224. Similarly, the band "two" recorder 240 receives all of the frequency band "two" outputs on cable array 230 from each of the trace band analyzers 214 through 224. Thus, each of the band recordings is representative of a particular band of frequency responses for all traces with each trace separately recorded.

The individual band recordings present in band recorders 228 and 240 through 248 are then ready for separate and succesive application to a loop playback 250 in the plotting mechanism 249 (FIG. 5B). In processing, the band recordings are each played back separately a successive number of times with a wide-head transducer (not shown) which is adjusted for the proper incremental angle on each playback. This incremental angle is controlled by adjustment of the playback head orientation control 254 and each time it is adjusted it also actuates the recording head location control 256 to energize the clutch 268 such that screw 270 moves the recording transducer 258 the proper incremental amount. Thus, recording transducer 258 remains stationary during a complete playback in loop playback 250 to record any indication which occurs at that particular angle of the wide-head transducer (not shown). The transduced energy is conducted on line 274 to a squaring and integrating circuit 276 which is periodically emptied upon actuation of the cam switch 266 to the recording transducer 258.

This procedure is carried out for each velocity interval which it is desired to inspect. As shown in FIG. 5B, the band "six" recording is on loop playback 250 and each different velocity inspection or sensing procedure, that is the scanning of a band recording at a given angle, would be carried out to plot the derived values across the band "six" track on plotting surface 259. The length of the track would be dependent upon the velocity range which the operator had chosen for inspection. Upon completion of the velocity sensing of the band "six" recording, the remaining band recordings would be successively inspected in the same manner, as the head supporting screw 270 is shifted to the proper frequency band location on the recording medium, to provide a complete power spectrum plot of frequency and wave number.

Figure 6:
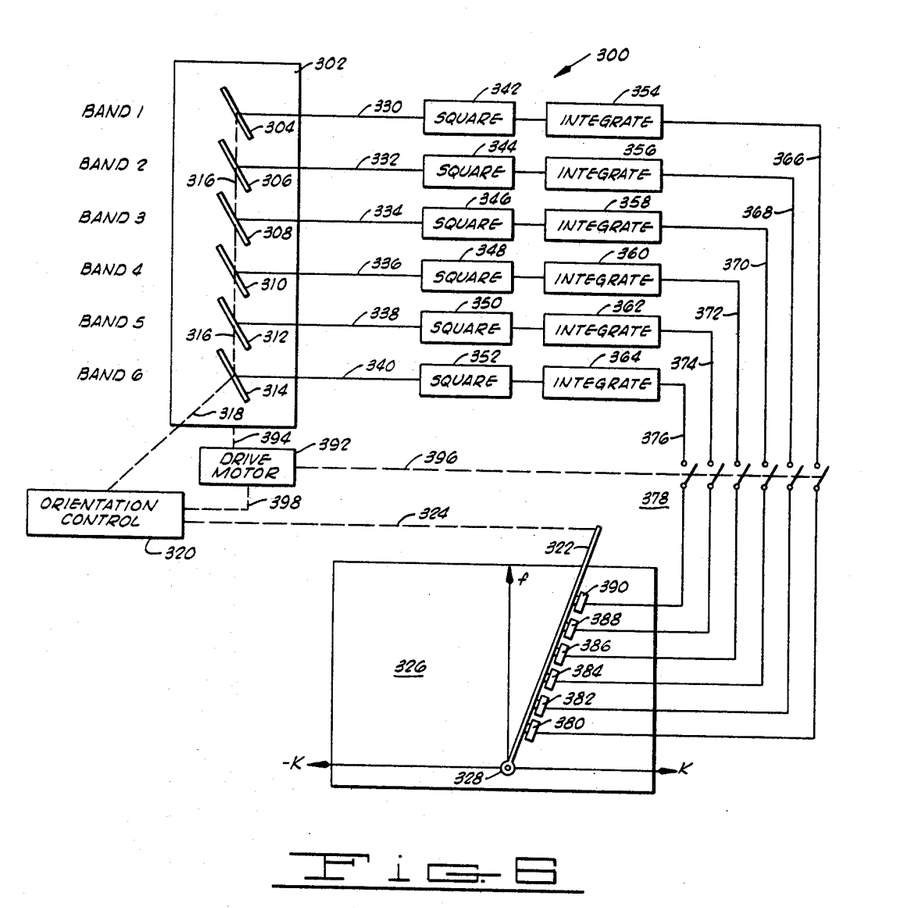
FIG. 6 is an alternative form of plotting apparatus.

*FIG. 6 embodiment*

Still another form of $f$–$k$ recording apparatus is shown in FIG. 6. This plotting mechanism 300 may use band recording information similar to that assembled in FIG. 5A. That is, the information assembled in each of band recorders 228 and 240 through 248 may be transferred by recording on the allotted band spaces on a wide recording drum or loop 302. This is a type of recording apparatus which is well known in the geophysical art and each of the band "one" through band "six" spaces may be provided to be wide enough to contain a large number of adjacent tracks.

Assuming the case of FIG. 5A, there would be required six tracks in each of the band "one" through band "six" allotments on the loop 302. Each of the multi-trace tracks on loop 302 is sensed by one of the wide-head summation transducers 304, 306, 308, 310, 312 and 314. A suitable mechanical linkage 316 interconnects each of the summation heads 304 through 314 and is effective to simultaneously position the summation heads in parallel relationship under control of a linkage 318 as driven by an orientation control 320. The orientation control 320 also moves a recording arm 322 through linkage 324 so that it is continually tracked at an angle on a plotting surface 326 which is equivalent to the sensing angle of summation heads 304 through 314. The recording arm 322 is suitably mounted on a pivotal axial member at point 328.

Each of the outputs from summation heads 304 through 314 is conducted via leads 330, 332, 334, 336, 338 and 340 to the conventional types of squaring circuits 342, 344, 346, 348, 350 and 352. The respective outputs from the squaring circuits 342 to 352 are then applied to the integrator circuits 354, 356, 358, 360, 362 and 364. The integrated outputs are then available on each of leads 366, 368, 370, 372, 374 and 376 to be applied upon suitable actuation of a ganged six member switch 378 to respective recording transducers 380, 382, 384, 386, 388 and 390 located along the recording arm 322. Recording transducers 380 through 390 would be affixed in their proper band positions along the length of recording arm 322, and it should be understood that such recording heads and their connection should be made easily detachable to enable the use of more or less recording heads along the extent of the recording arm 322. This, of course, would depend upon the degree of frequency resolution required or desired and six frequency bands have been selected here for purposes of illustration.

A drive motor 392 is connected through mechanical linkage 394 to rotate the loop playback or tape drum 302. A further control force from drive motor 392 is directed by suitable power transmission nlikage 396 to actuate the gang-switch 378. This gang-switch 378 is synchronized in a similar manner as in FIGS. 3 and 5B such that it will be actuated closed at a position indicative of complete loop sensing, thereby emptying the voltage values in the integrators 354 through 364 into their respective recording transducers 380 through 390.

If desired, the orientation control 320 may be manually operated to provide the desired angular setting of summation heads 304 through 314 and, consequently, through linkage 324 the desired angular setting will also be adjusted for recording arm 322. Such orientation control is well within normal skill. Drive motor 392 can then rotate the tape drum 302 and, at the proper times, close the gang-switch 378 to empty the integrated information into the recorder transducers 380 through 390.

However, automatic operation can be easily arranged for the whole operation. Drive motor 392 provides a mechanical coupling through linkage 398 such that the orientation control 320 is continually energized to rotate the summation heads 304 through 314 while turning the recording arm 322 about its axis 328. In this manner, the $f$–$k$ plot is produced continuously since the summation heads 304 through 314 and the radial arm 322 are turned at a rate slow enough so that they are substantially in the same position during a single scanning of the seismic band information stored on the tape drum 302. In view of the limited range of the apparent velocities present in a seismic section, it is acceptable to approximate the horizontal frequency bands by the corresponding arcs of circles described by the recording transducers 380 to 390 which are fixed along the radial recording arm 322.

In operation of the plotting mechanism 300 the seismic band information may be first compiled as shown in the mechanism 199 of FIG. 5A and then transferred either in the field or later in the laboratory to the apparatus of FIG. 6. That is, the individual band records could be played back and re-recorded on the multi-trace band segments of the tape drum 302. It should be understood too that in an integrated equipment it would probably be desirable to form the individual band recordings, as performed in recorders 228 and 240 through 248 of FIG. 5A, directly onto a wide tape or record surface such as the tape drum 302 for immediate or later processing to form the frequency versus wave number plot.

The wide-head transducers 304 to 314, each aligned at the same angular setting as controlled by orientation control 320, are made to sense a complete playback of loop or drum 302 for each angular setting. This angle at which the sensing takes place will be equivalent of limiting the electrical output to indications which had arrived at a precise apparent velocity as originally recorded at the geophone array. The algebraically summed output from the wide-head transducers 304 through 314 is then conducted to the respective squaring circuits 342 through 352 and then to the integrators 354 through 364 where the voltage value is available on lines 366 through 376 at the gang-switch 378. Upon actuation from the drive motor 392, after drum 302 has made a complete playback, the gang-switch 378 is actuated closed to empty the respective integrated voltage values from lines 366 through 376 into the transducer elements 380 through 390.

The recorder arm 322 will have been aligned on plotting surface 326 at an angle which is coordinated by orientation control 320 with the sensing angle of the wide-head transducers 304 through 314. Hence, recorder arm 322 is positioned along a line which can be equated to apparent velocity and the wide-head transducers 304 through 314 have sensed information pertaining to a particular frequency band response which is then recorded by transducers 380 through 390 in the proper frequency latitude on plotting surface 326. Thus, the plot indicates the seismic energy in the various frequency bands which has been initially detected as arriving at a particular apparent velocity.

Thus, when the wide-head transducers 304 through 314 are caused to sense the plural band recording drum 302, a complete time for each of a series of incremental angular settings, with consequent coordinated rotation of the recording arm 322, a complete energy distribution pattern can be recorded on the plotting surface 326. The degree of completeness may be varied depending upon the range of the velocities within which it is desired to gather data. Subject to this variable degree of completion, a plot of frequency $f$ and wave number $k$ will be composed on the plotting surface 326.

The foregoing sets forth the method and apparatus for compiling a power spectrum plot of seismic energy distribution for a given area of survey. The operation is performed with recording, signal processing and other equipment which are largely known and in use in the geophysical prospecting art. It should be understood then that many equivalents may be substituted for the like components of the present apparatus which have been set forth herein for compiling the power spectrum plot. It should be restated too that the wave forms exemplified herein are highly idealized and that much more complex response must be dealt with in the actual signal handling and compilation of the plot. In most cases, it will be desirable to inspect a greater number of frequency ranges while at the same time repeating the summation process for a very large number of different angular contacts to the seismic energy pattern. The completeness of plot and the requirements as to the extent of the operation will be dictated by the individual terrain and subsurface geometry in the area of interest.

Changes may be made in the combination and arrangement of steps and elements as heretofore set forth in the drawings. It being understood that changes may be made

What is claimed is:

1. Apparatus for compiling a two-dimensional power spectrum of a multi-trace seismic record comprising:
   means for sensing all traces of the seismic record a plurality of times and with a predetermined time delay between each of the traces to provide successive algebraically summed signals;
   means receiving said summed signals for deriving for each successive signal an electrical indication of the energy of the sensed information in each of a plurality of frequency bands; and
   means for recording the electrical indication as a function of the frequency and the time delay between said seismic traces.

2. Apparatus for compiling a two-dimensional power spectrum of a multi-trace seismic record comprising:
   means for simultaneously sensing all traces of the seismic record with a predetermined equal time delay between each of the traces;
   means for separating the sensed output into a plurality of outputs, each representative of seismic signal energy within a different frequency range;
   means for individually storing each of said outputs of different frequency ranges; and
   means for sequentially recording the stored outputs in a relationship coordinated with said predetermined time delay as a plot of frequency versus wavenumber.

3. Apparatus for plotting the frequency and wave number content of a multi-trace seismic record comprising:
   transducing means for deriving an electrical signal which is the algebraic summation of all trace values with a predetermined time difference interposed between each of the traces;
   means for dividing said signal into plural signals equal to the constituent parts within predetermined different frequency bands;
   means for storing each of said plural electrical signals as a voltage indicating a relative energy value;
   a recording surface having rectangular dimensions which are equated to frequency and wave number;
   a recording arm pivotally supported at the frequency end and wave number center of the dimensions of the surface;
   recording transducer means movably positioned on said recording arm;
   means for successively applying said stored energy value voltages to said transducer means;
   means for controlling the angle of the recording arm so that it tracks in proportion to the time difference interposed between the traces; and
   means for controlling the position of the recording transducer along the recording arm so that it tracks with said means for successively applying.

4. Apparatus for compiling a plot of the frequency and wave number power spectrum from a multi-trace seismic record comprising:
   pick-up means which is adjustable as to its angle of operation for simultaneously transducing each of the traces of a seismic record and providing a single, algebraically summed output;
   frequency analyzing means receiving said summed output and providing a plurality of outputs each limited to a predetermined different frequency range;
   means for storing each of said plurality of outputs;
   recording means including a pivotable recording arm mounted thereon;
   means for tracking the angle of the pivotable recording arm and maintaining it at an angle coordinated with said pick-up means;
   transducer means movably mounted on said recording arm to be positioned along the length thereof;
   means for successively applying the stored plurality of outputs having different frequency ranges to the transducer means; and
   means controlled by said means for applying to position said transducer means along said recording arm.

5. Apparatus for plotting the frequency and wave number content of a multi-trace seismic record comprising:
   a plurality of recorder pick-up means for sensing and providing an output of each trace of the seismic record;
   plural band analyzer means each receiving a sensed output and each analyzer providing a further output for each of a plurality of frequency ranges;
   plural band recorder means, each recording on separate traces the analyzer output from each analyzer means which is in the same frequency range such that each of the plural band recorders produces a plural trace seismic record in a different frequency range;
   playback means for successively sensing each of the band recordings to derive an algebraically summed trace output signal having predetermined time differences interposed between the traces;
   means for integrating each output signal;
   recorder means having a plurality of separate, parallel recording axes;
   means for recording the integrated signal values for each band recording of different frequency range on a separate axis;
   means positioning the means for recording along the respective axis in proportion to the amount of predetermined time difference; and
   means for moving the means for recording to the successive adjacent axes representative of the successive frequency ranges for similar operations of said positioning on each axis.

6. Apparatus for plotting the frequency and wave number content of a multi-trace seismic record comprising:
   a plurality of recorder pick-up means for sensing and providing an output of each trace of the seismic record;
   plural band analyzer means receiving each sensed output and each analyzer providing further outputs for each of a plurality of frequency ranges;
   plural band recorder means each recording on separate traces all analyzer outputs which are in a respective one of the frequency ranges such that each of the plural band recorders produces a seismic record having frequencies in a different range;
   plural wide head playback means each adjustable to a predetermined angle relative to record movement for successively sensing each of the band recordings to derive an algebraically summed trace value output for each of the band recordings with a predetermined time differences between the traces;
   plural means for squaring and integrating each of the outputs from said plural playback means to provide plural outputs indicative of energy level;
   a plotting surface;
   a recording arm which is pivotally affixed at one side of said plotting surface;
   a plurality of recording transducers affixed along said recording arm and each transducer being energized by one of said integrated outputs from said squaring and integrating means; and
   means for coordinating the angular movement of said pivotally affixed recording arm with said predetermined angle of said plural wide head playback means and thus with the time difference between each of the traces played back.

7. Apparatus for plotting the frequency and wave number as set forth in claim 6 which is further characterized to include:
   plural wide-head transducer means for successively sensing each of the band recordings to derive an algebraically summed trace value; and means for orienting each of said wide-head transducers to successive equal angles across said band recording traces to thereby interpose a predetermined time difference between traces at each angle.

8. Apparatus for plotting the frequency and wave number content of a multi-trace seismic record comprising:

playback means for receiving a multi-trace seismic record;

wide-head transducer means which is pivotally mounted for simultaneously transducing all traces at a predetermined angle of contact to provide an output which is the algebraic sum of all traces;

band analyzing means for receiving said wide-head transducer output and dividing it into a plurality of outputs each pertaining to a predetermined frequency band;

means for deriving an integrated signal for each of said plurality of outputs;

plotting means including a plotting surface having a pivotable recording arm mounted thereon;

means for coordinating the angular movements of said wide-head transducer means with the angular position of said recording arm;

recording transducer means movably mounted on said recording arm for longitudinal movement therealong;

rotatable selector switch means for sequentially applying each of said integrated outputs pertaining to a different frequency band to said transducer means; and means for coordinating the movement of the rotating selector switch with the traverse of the recording transducer longitudinally along the recording arm so that each of said sequential integrated outputs will affect said recording transducer at a latitude on said plotting surface which corresponds to a predetermined frequency band.

9. Apparatus for plotting the frequency and wave number content of a multi-trace seismic record as set forth in claim 8 wherein said means for deriving comprises:

means for squaring and integrating each of the said plural outputs from said band analyzer means.

10. Apparatus as set forth in claim 8 wherein said band analyzer means comprises:

a recording loop means;

transducer means for receiving said wide-head output and recording the voltage on said record loop means; and correlation pick-up head means in transducing contact with said loop and having a frequency selective transduction pattern to provide plural outputs in the different selected frequency ranges.

11. Apparatus for plotting the frequency and wave number content of a multi-trace seismic record comprising:

playback means for receiving a multi-trace seismic record (50);

wide-head transducer means (58) for simultaneously transducing all traces at a predetermined angle of contact to provide an output (66) which is the algebraic sum of all traces;

band analyzing means (68) for receiving said wide-head transducer output (66) and dividing it into a plurality of outputs (156 to 170) each pertaining to the energy in a predetermined, different frequency band;

rotatable selector switch means (172) for successively conducting each of said plural outputs from different frequency bands;

plotting means (178) including a plotting surface (180) having a pivotable recording arm (188) mounted thereon;

a recording transducer (192) movably mounted on said recording arm for longitudinal movement therealong;

means for coordinating the angular movement of said recording arm (188) with the angle of contact of said wide head transducer means; and means for coordinating the movement of the rotating selector switch with the traverse of the recording transducer (192) along the recording arm (188) so that said plural output voltages (156 to 170) will affect said recording transducer (192) at a latitude on said plotting surface (180) which corresponds to a predetermined frequency band.

References Cited

UNITED STATES PATENTS

| | | | |
|---|---|---|---|
| 2,914,854 | 12/1959 | Westphal | 340—15.5 X |
| 3,258,755 | 6/1966 | Guerth | 340—174.1 |
| 3,274,541 | 9/1966 | Embree | 340—15.5 |
| 2,427,421 | 9/1947 | Rieber | 340—15.5 X |
| 3,051,897 | 8/1962 | Peterson et al. | |
| 3,300,754 | 1/1967 | Lee et al. | 340—15.5 |

RODNEY D. BENNETT, *Primary Examiner.*

BENJAMIN A. BORCHELT, *Examiner.*

R. M. SKOLNIK, D. C. KAUFMAN,
*Assistant Examiners.*